United States Patent [19]

Hefti

[11] Patent Number: 5,293,399
[45] Date of Patent: Mar. 8, 1994

[54] IDENTIFICATION SYSTEM

[75] Inventor: Aldo Hefti, Biasca, Switzerland

[73] Assignee: R. Audemars SA, Lugano, Switzerland

[21] Appl. No.: 449,900

[22] PCT Filed: Oct. 8, 1987

[86] PCT No.: PCT/EP87/00584
§ 371 Date: Dec. 8, 1989
§ 102(e) Date: Dec. 8, 1989

[87] PCT Pub. No.: WO88/03687
PCT Pub. Date: May 19, 1988

[51] Int. Cl.$^5$ .............................................. H04B 1/38
[52] U.S. Cl. ............................................ 375/7; 375/59; 375/75; 340/825.54
[58] Field of Search .................. 375/7, 68, 52, 67, 83, 375/75, 59; 340/825.54, 825.31, 825.34; 342/44; 365/189.01, 192; 341/70

[56] References Cited

U.S. PATENT DOCUMENTS

| | | | |
|---|---|---|---|
| 4,129,855 | 12/1978 | Rodrian | 340/825.54 |
| 4,463,353 | 7/1984 | Kuzara | 340/825.54 |
| 4,724,427 | 2/1988 | Carroll | 340/825.54 X |
| 4,730,188 | 3/1988 | Milheiser | 340/825.72 X |

FOREIGN PATENT DOCUMENTS

| | | |
|---|---|---|
| 0006691 | 6/1979 | European Pat. Off. . |
| 0170716 | 8/1984 | European Pat. Off. . |
| 2544867 | 4/1984 | France . |
| 8503831 | 8/1985 | PCT Int'l Appl. . |
| 8604171 | 7/1986 | PCT Int'l Appl. . |
| 2164825 | 9/1985 | United Kingdom . |
| 2163324 | 2/1986 | United Kingdom . |

*Primary Examiner*—Curtis Kuntz
*Assistant Examiner*—Tesfaldet Bocure
*Attorney, Agent, or Firm*—Richard Linn

[57] ABSTRACT

The proposed device is an identification system having an interrogator/receiver and a passive transponder. The interrogator/receiver includes a clock signal generator (1) a group of bandpass filters (5), a section to decode the data received, and an interrogator coil (4) for inductively coupling the interrogator/receiver to the transponder. The transponder includes a section (E) for picking up the power signal transmitted by the interrogator/receiver, a section (F) to codify the signal obtained according to a predetermined code stored in a memory (15), and a section (G) for phase modulating the codified data so as to allow air transmission. Particularly, the bandpass filters (5) are capable of detecting a frequency band width lower than one thousandth of the signal's frequency.

6 Claims, 5 Drawing Sheets

IDENTIFICATION SYSTEM

BACKGROUND OF THE INVENTION

1. Field of the Invention

This invention relates to identification remote control and, in particular, it consists of an interrogator/receiver and a passive transponder. This group allows the univocal identification of a still or moving object, animal or person by producing a coded identification signal in answer to a signal sent by the interrogator/receiver that is inductively coupled with the transponder.

2. Description of Prior Art

Some remote control identification systems have already been proposed and used in which an interrogator acts to generate an A.C. clock signal that also acts as a power signal. By means of an inductive coupling, a transponder receives said signal and uses it as its power supply, thus generating a coded reply signal that is picked up by the interrogator/receiver. The coded signal is characteristic to that transponder, thus the object, animal or person, to which the transponder is associated can easily be recognized by the interrogator.

Particularly, in the device described in the patent application WO 85/03831, the clock signal sent by the interrogator and received by the transponder by means of the inductive coupling is at first reduced in frequency, then its frequency is further divided (for instance by eight or ten). An alternate current signal is thus produced having a frequency varying between two values; any variation from a frequency to another represents a value of "zero" or "one".

The encoding of this signal is obtained by means of a Manchester encoder, while its modulation is carried out by means of FSK system (frequency shift keying). The modulated signal returns to the interrogator by means of an inductive coupling, it is filtered through bandpass filters which partially eliminate the background noise, then it is sent to a FSK demodulator capable of recognizing the frequency variations of the signal. Then a microcomputer extracts the identification code and is able to transfer it to a monitor, a printer, a disk or other storage systems or to another computer.

The main disadvantage of this device is the need to use, for isolating the signal sent by the transponder, bandpass filters having a frequency band width at least equal to the difference between the two frequency values of the signal. In this way the background noise having a frequency comprised between the modulated signal frequency values, is allowed to pass through the filters and the recognition of the identification signal is sometimes difficult, particularly in a highly electromagnetically disturbed environment. Thus only the reduction of the maximum allowable distance between the interrogator and the transponder allows a sure identification.

Moreover, the device employs unalterable memories therefore its use is limited to simple identification systems.

SUMMARY OF THE INVENTION

Object of this invention is, therefore, that to increase the maximum distance between interrogator and transponder with no power increase and to allow transmissions to occur also in bad conditions.

A further object is that to extend the utilization field of the device.

The main object has been achieved by providing a device of the kind mentioned above, that is made of an interrogator/receiver and passive transponder inductively coupled, in which the former generates a power signal of a predetermined frequency that is received by the latter that utilizes it as a clock signal for generating a codified reply signal, said signal being phase modulated between two predetermined values such that each phase shift from a value to the other corresponds to a "zero" or a "one" of the binary identification code. Then the modulated signal is sent again to the interrogator by means of an inductive coupling, filtered through bandpass filters, demodulated and decoded; the identification code is thus identified.

From the aforesaid it will be noted that in the proposed device bandpass filters can be used having a very narrow frequency band width (less than one thousandth of the modulated signal frequency), thus allowing a more efficacious discrimination of the signal from the background noise. This allows the use of the identification device also in environments highly disturbed electromagnetically, and also the increase of the maximum distance between the interrogator and transponder, distance, in which it is still possible to have a sure identification.

An improvement of the invention foresees the use of non-volatile memories of the EPROM and EEPROM kind that allow to modify, when necessary, the information contained in the transponder: it must be stressed that the use of the EEPROM memory allows the use of the device not only as a recognition system but also as a register for data, which can be read and written at a distance.

BRIEF DESCRIPTION OF THE DRAWINGS

The above described invention will be schematized in the enclosed drawings in which.

DETAILED DESCRIPTION OF THE PREFERRED EMBODIMENT

Figure 1:
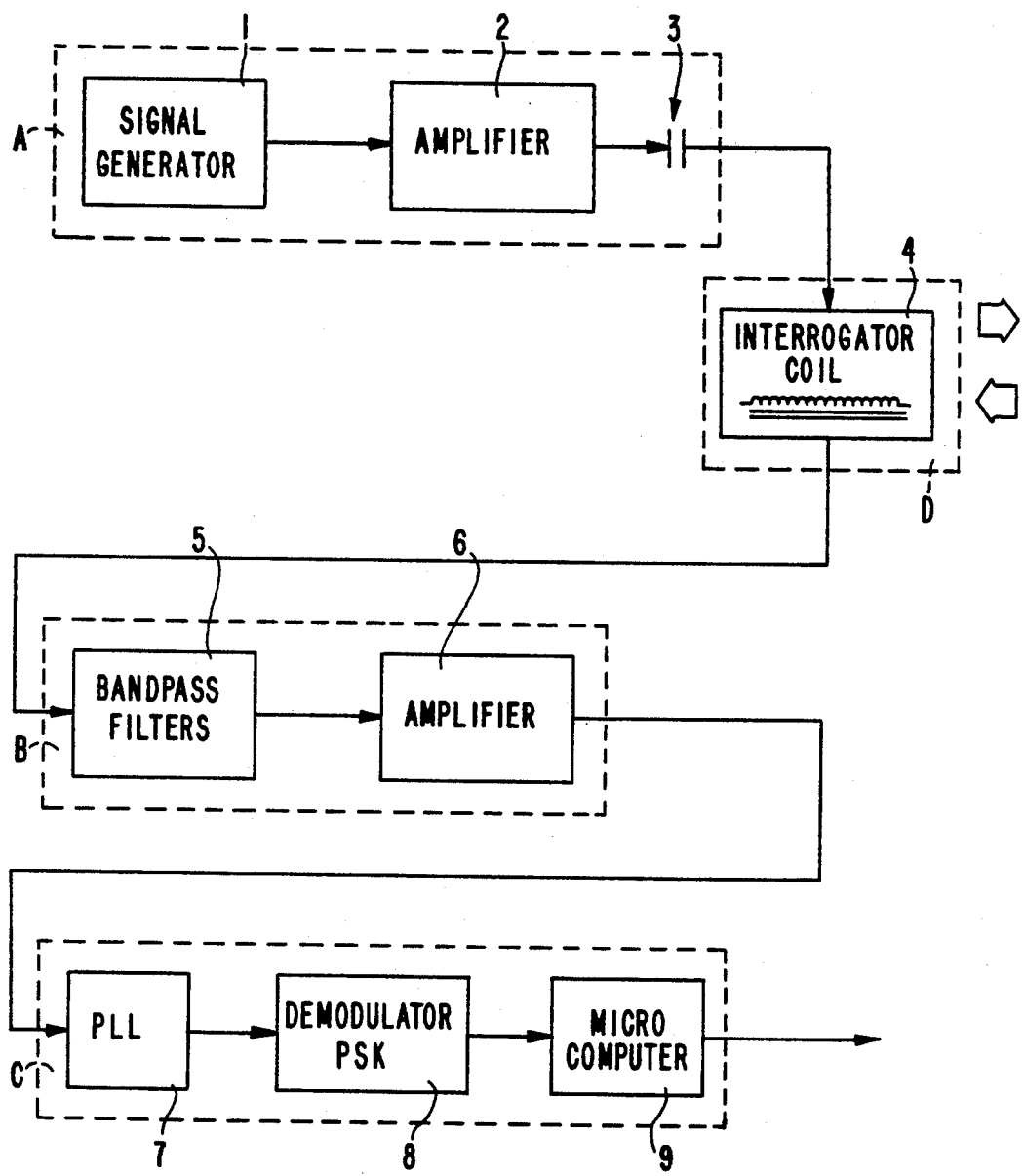
FIG. 1 is a block diagram of the interrogator/receiver.

Referring to FIG. 1 it will be noticed that the proposed interrogator/receiver comprises the following sections:

A) An excitation section A, comprising a signal generator 1, followed by an amplifier 2 and a capacitor 3. The capacitor 3 and the interrogator coil 4 are selected so as to resonate at the frequency of the generated signal, so that the voltage across the coil is much greater than the voltage output from the signal generator.

B) A signal conditioning section B, connected to the interrogator coil 4, able to recognize the presence of a predetermined frequency signal and to discriminate it from the background noise. Said section comprises multistage bandpass filters 5, followed by an amplifier 6.

C) A demodulating and decodifying section C connected to the amplifier 6 and comprising a PLL (phase locked loop) 7, a demodulator PSK and a microcomputer 9.

D) A section D for the inductive coupling (i.e., transmitting and receiving inductive signals) between the interrogator/receiver and the transponder, namely coil 4.

Figure 2:
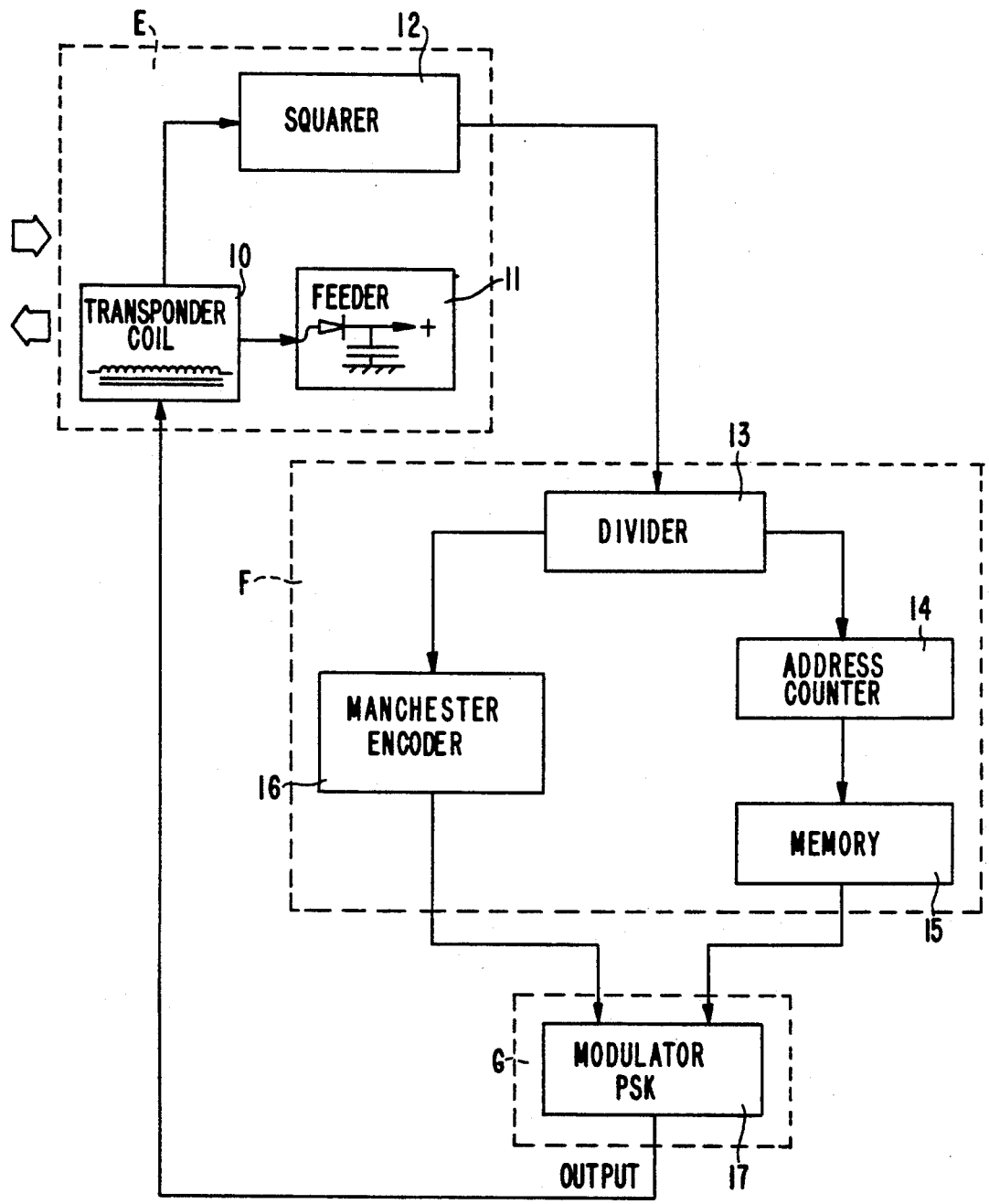
FIG. 2 is a block diagram of the transponder.

Referring to FIG. 2 it will be noticed that the proposed transponder is made of the following sections:

E) A section E for picking up the power signal transmitted by the interrogator/receiver comprising a coil 10 followed by a power supply feeder 11 and a squarer 12. The feeder 11 includes a rectifier and a filter condenser for converting the energy received from the power signal into a DC voltage for using said signal to supply power to the transponder. The squarer 12 is provided for using this signal as a clock signal for the generation and the codification of the data.

F) A section F f or dividing the clock signal frequency by a predeterminate value by means of a divider 13 and able to codify the resulting signal according to a predeterminate code contained in a memory 15 accessible by means of an address counter 14, by means of a Manchester encoder 16.

G) A section G having a modulator 17 for modulating the encoded data so as to allow air (inductive) transmission from the coil of the transponder.

Figure 3:
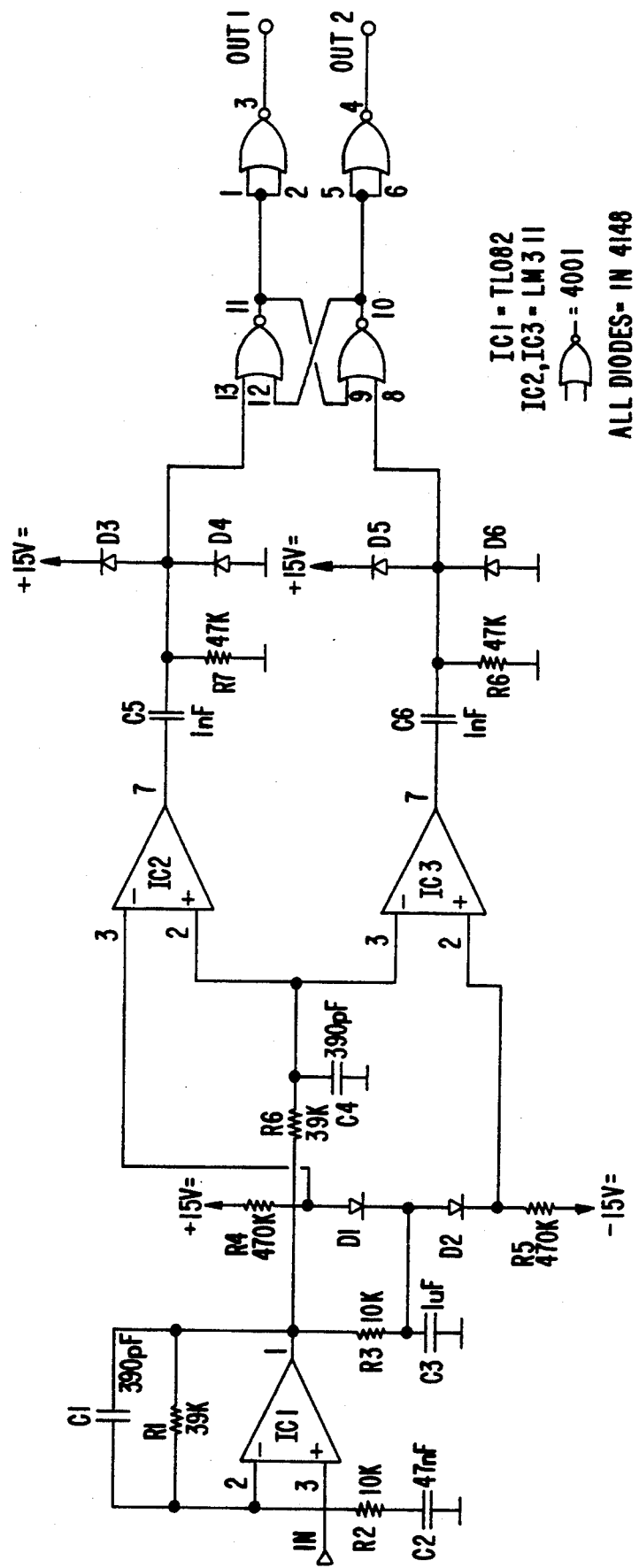
FIG. 3 is a diagram of the demodulator PSK.

FIG. 3 shows the diagram of the demodulator PSK that comprises, for instance, the following integrated circuits:

a TLO82 - operational amplifier
two LM311 - voltage comparators
a 4001 - two entry NAND gate quadruple
and other components such as resistors (R1, R2, R8), 15. capacitors (C1, C2, ... C6) and diodes (D1, D2, ... D6). The respective values of the resistors and the capacitors are shown in the diagram.

Figure 4:
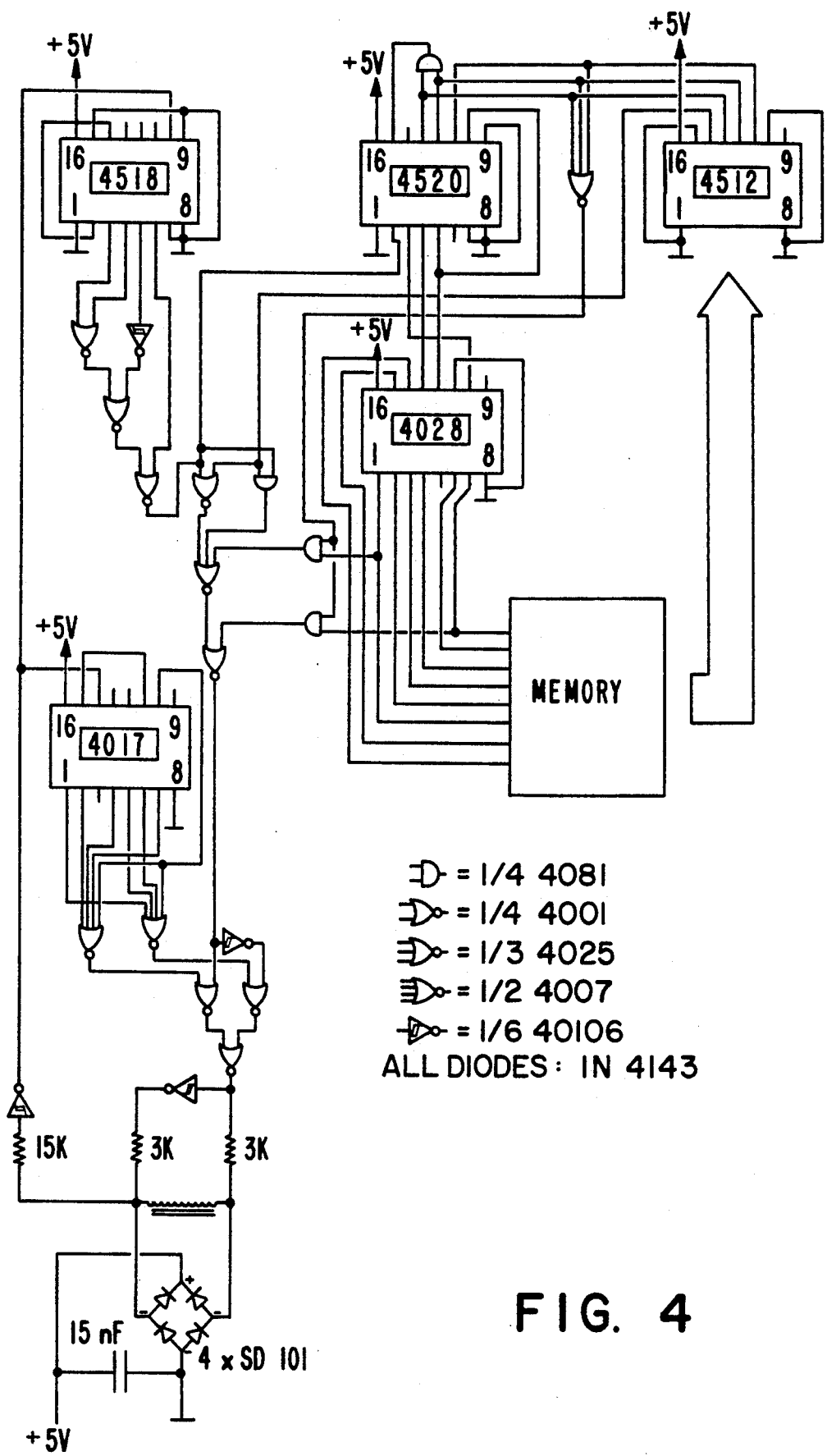
FIG. 4 is a diagram of the transponder.

FIG. 4 shows a diagram of the transponder realized in this embodiment with the following integrated circuits:

4001—two entry NOR gate—quadruple
4007—four entry NOR gate—double
4017—decade counter with ten decoded exists
4025—three entry NOR gate—triple
4028—decimal decoder
4081—two entry AND gate quadruple
4512—eight channels data selector
4518—double decimal synchronous counter
4520—double binary synchronous counter
40106—sextuple "Schmitt-Trigger" inverter and other components such as resistors, capacitors and diodes (the resistors and the capacitors are characterized by their respective values), as well as a EPROM or EEPROM memory.

Figure 5:
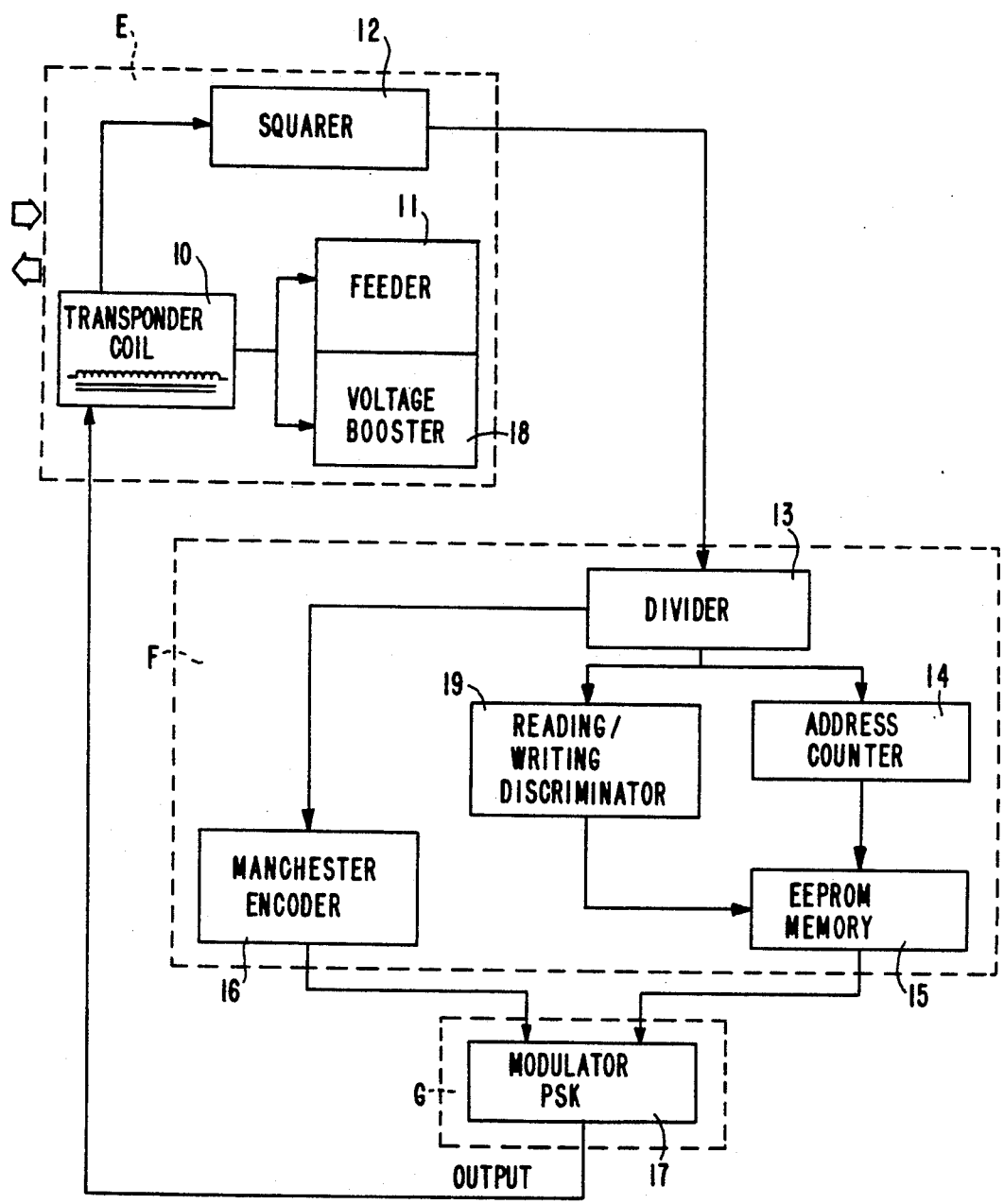
FIG. 5 is a block diagram of the transponder showing components for the reading and/or the writing of the EEPROM memory.

FIG. 5 is the transponder equipped with a non-volatile memory of the EEPROM kind that can be modified at a distance.

Three sections E, F and G are foreseen comprising the components described in FIG. 2 with a voltage booster 18 added in section E for the generation of the particular programming voltage, and a memory management block added in section F, comprising a writing/reading discriminator 19.

I claim:

1. An identification system comprising:

an interrogator/receiver comprising the following sections:

A) a section comprising a clock signal generator having a predetermined frequency for generating an RF power signal;

B) a signal conditioning section comprising a bandpass filter for recognizing the presence of a modulated signal having predetermined frequency and for discriminating between data and ground noise components of said modulated signal;

C) a section having a demodulator means for decoding data received from the signal conditioning section in order to make said data intelligible to a digital processor; and D) a section comprising a coil means connected to said signal generator for transmitting said RF power signal and to said signal conditioning section for inductively coupling the interrogator/receiver with a passive transponder;

the passive transponder comprising the following sections:

E) a section for picking up the RF power signal transmitted by the interrogator/receiver, comprising a coil followed by a rectifier and a filter condenser for converting said RF power signal to supply DC power to the transponder, and a squarer means for using said RF power signal as clock for generating data;

F) a section comprising an encoder means for encoding said data generated by said squarer means according to a predetermined code contained in a memory; and G) a section comprising means for phase modulating the encoded data to create said modulated signal for inductive transmission from said coil of the transponder;

wherein the RF power signal frequency is in the range of hundreds of kHz, and said modulated signal frequency is in the range of tens of kHz, the modulated signal being obtained by using a frequency divider located in the transponder, said bandpass filter being a very selective, multistage filter discriminating a frequency band width being not higher than one thousandth of the frequency of the signal transmitted by the transponder, and said demodulator means comprising a phase locked loop means.

2. A system according to claim 1, characterized in that the memory is of the EPROM non-volatile kind.

3. A system according to claim 1, characterized in that the memory is of the EEPROM kind.

4. A system according to claim 3, characterized in that said transponder further includes a positive voltage booster and an additional memory management section comprising a reading/writing discriminator.

5. A system according to claim 1, characterized in that the squarer is of the Schmitt-Trigger kind.

6. A system according to claim 1, characterized in that the encoder is of the Manchester kind.

* * * * *

UNITED STATES PATENT AND TRADEMARK OFFICE
CERTIFICATE OF CORRECTION

PATENT NO. : 5,293,399
DATED : March 8, 1994
INVENTOR(S) : ALDO HEFTI

It is certified that error appears in the above—identified patent and that said Letters Patent is hereby corrected as shown below:

In the cover page, Item "[73] Assignee," --R. Audemars SA, Lugano, Switzerland-- is deleted, and "Datamars SA, Cadempino, Switzerland" is substituted therefor.

Signed and Sealed this

Fourteenth Day of May, 1996

BRUCE LEHMAN

Attest:

Attesting Officer

Commissioner of Patents and Trademarks